United States Patent
Trabelsi et al.

(10) Patent No.: US 11,108,833 B2
(45) Date of Patent: Aug. 31, 2021

(54) CROSSED-INVITE CALL HANDLING

(71) Applicant: BlackBerry Limited, Waterloo (CA)

(72) Inventors: Bechir Trabelsi, Nepean (CA); Andrew Michael Allen, Hallandale Beach, FL (US); Kevin N. Chen, Ottawa (CA); Lawrence Edward Kuhl, Waterloo (CA)

(73) Assignee: BlackBerry Limited, Waterloo (CA)

( * ) Notice: Subject to any disclaimer, the term of this patent is extended or adjusted under 35 U.S.C. 154(b) by 938 days.

(21) Appl. No.: 15/173,860

(22) Filed: Jun. 6, 2016

(65) Prior Publication Data
US 2017/0353503 A1    Dec. 7, 2017

(51) Int. Cl.
*G06F 15/16* (2006.01)
*H04L 29/06* (2006.01)
*H04W 76/10* (2018.01)

(52) U.S. Cl.
CPC ...... *H04L 65/1069* (2013.01); *H04L 65/1006* (2013.01); *H04L 65/1059* (2013.01); *H04L 65/1096* (2013.01); *H04W 76/10* (2018.02)

(58) Field of Classification Search
CPC ............. H04L 65/1096; H04L 65/1059; H04L 65/1006; H04L 65/1069; H04L 65/403; H04W 76/10
(Continued)

(56) References Cited

U.S. PATENT DOCUMENTS

2006/0294112 A1* 12/2006 Mandato ............. H04L 65/1096

2008/0189487 A1* 8/2008 Craske ................ G06F 12/0859
711/125
(Continued)

FOREIGN PATENT DOCUMENTS

| EP | 2924945 | 9/2015 | | |
| WO | WO-2006118397 A1 * | 11/2006 | ........ | H04L 65/1006 |
| WO | WO-2016010658 A1 * | 1/2016 | ............. | H04W 4/16 |

OTHER PUBLICATIONS

Impact of dynamic priority scheme on IP Multimedia Subsystem Lava Al-Doski;Seshadri Mohan 2014 IEEE International Systems Conference Proceedings (Year: 2014).*
(Continued)

*Primary Examiner* — Oscar A Louie
*Assistant Examiner* — Oluwatosin M Gidado
(74) *Attorney, Agent, or Firm* — Rowand LLP

(57) ABSTRACT

A method and devices for handling crossed-invite situations in set-up of IP-based sessions. A local device receives an incoming session invite after sending an outgoing session invite before the outgoing session invite has been accepted. It then determines that the incoming session invite was sent by the remote device to which the outgoing session invite is also addressed. The method includes determining a remote device priority value from identifying information contained in the incoming session invite, comparing the remote device priority value with a local device priority value to determine whether the remote device or the local device is higher priority and, if the remote device is higher priority, canceling the outgoing session invite and displaying an incoming call answer screen for the incoming session invite, and if the local device is higher priority, waiting for cancelation of the incoming session invite and acceptance of the outgoing session invite.

11 Claims, 6 Drawing Sheets

(58) Field of Classification Search
USPC .......................................................... 709/227
See application file for complete search history.

(56) References Cited

U.S. PATENT DOCUMENTS

| | | | | |
|---|---|---|---|---|
| 2010/0085959 A1* | 4/2010 | Vohra | ................... | H04L 65/1046 370/352 |
| 2010/0234057 A1* | 9/2010 | Drozt | ................... | H04L 63/0407 455/518 |
| 2011/0051731 A1* | 3/2011 | Mang | ................... | H04L 47/2458 370/395.21 |
| 2011/0075653 A1 | 3/2011 | Potts et al. | | |
| 2011/0090902 A1* | 4/2011 | Jung | ................... | H04L 65/1016 370/352 |
| 2011/0175923 A1* | 7/2011 | Mahajan | ................ | G06T 11/60 345/522 |
| 2015/0067691 A1* | 3/2015 | Johnson | ................ | G06F 9/5016 718/103 |
| 2015/0181023 A1* | 6/2015 | Citron | ............... | H04M 3/42059 379/207.02 |
| 2015/0237641 A1* | 8/2015 | Sahu | ..................... | H04W 72/10 370/315 |
| 2015/0358403 A1* | 12/2015 | Bodstrom | ............. | H04W 84/20 709/209 |
| 2016/0286038 A1* | 9/2016 | Georgiou | ............. | H04M 3/436 |
| 2016/0338107 A1* | 11/2016 | Zeng | ..................... | H04W 16/14 |
| 2017/0111401 A1* | 4/2017 | Le Razavet | ......... | H04L 65/1046 |
| 2017/0238359 A1* | 8/2017 | Atarius | ................. | H04W 76/50 370/259 |

OTHER PUBLICATIONS

A Cross-Layer Distributed Call Admission Control Osama Baldo 2009 IEEE International Conference on Wireless and Mobile Computing, Networking and Communications (Year: 2009).*

Rosenburg et al.: "SIP: Session Initiation Protocol", dated Jun. 1, 2002, p. 12, XP055354868.

EPO, Extended European Search Report relating to EP application No. 17169396.3, dated Aug. 11, 2017.

* cited by examiner

1

CROSSED-INVITE CALL HANDLING

FIELD

The present application generally relates to session management and, in particular, handling when two end points send respective invites to each other to set up a session.

BACKGROUND

Multimedia sessions are typically established using an invite message. For example, a voice call over LTE (VOLTE) may be established using messaging that includes sending an invite message from a calling device to a called device. These messages are relayed through various servers and other devices.

When a device is actively engaged in trying to set up a session with another device, it is usually prescribed that the device will refuse incoming requests for sessions. For example, if the device is already awaiting a response to an invite it sent to a remote device upon receiving an incoming invite message the device may reply with a busy message. However, there can be situations in which two devices are mutually attempting to establish a session with each other in which each device receives the other devices invite message after it has already sent its outgoing invite message. In this case, both devices would refuse the incoming invite and the session set-up would fail. This may be termed a "crossed-invite" situation.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

Figure 1:
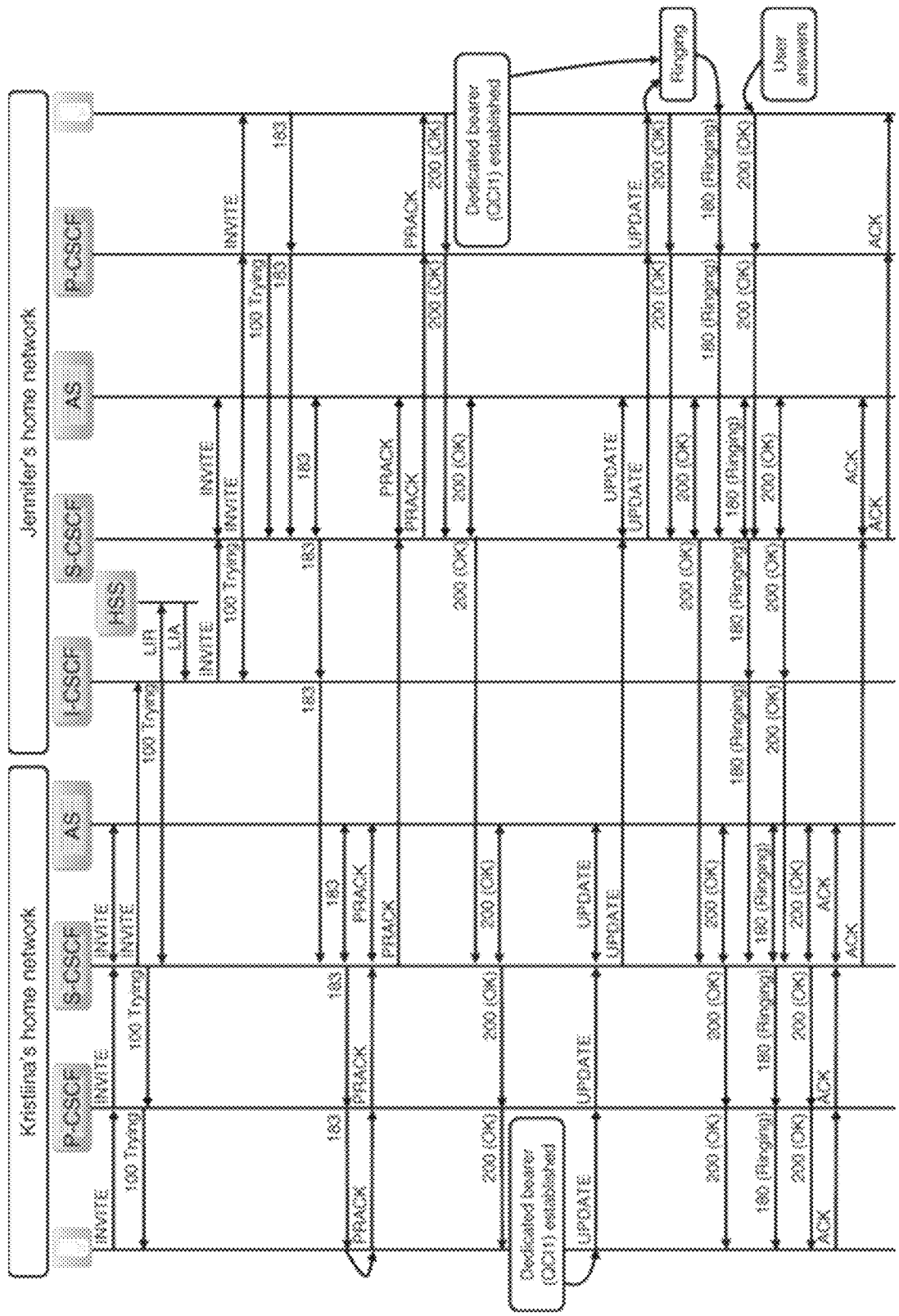
FIG. 1 shows a signal diagram illustrating the typical message flow for establishing a VOLTE call session between two VOLTE devices.

In a first aspect, the present application describes a method implemented at a local device for handling crossed-invites during set-up of an IP-based session with a remote device. The method includes receiving an incoming session invite after sending an outgoing session invite before the outgoing session invite has been accepted; determining that the incoming session invite was sent by the remote device to which the outgoing session invite is also addressed; determining a remote device priority value from identifying information contained in the incoming session invite; comparing the remote device priority value with a local device priority value to determine whether the remote device or the local device is higher priority; and, if the remote device is higher priority, canceling the outgoing session invite and displaying an incoming call answer screen for the incoming session invite; and if the local device is higher priority, waiting for cancelation of the incoming session invite and acceptance of the outgoing session invite.

In another aspect, the present application describes a local device configured to handle crossed-invites during set-up of an IP-based session with a remote device. The local device includes a processor; memory; a communication subsystem to connect to a network to, under control of the processor, send and receive messages and establish sessions with other devices; and a session handling module. The module includes processor-executable instructions that, when executed by the processor, cause the processor to receive an incoming session invite after sending an outgoing session invite before the outgoing session invite has been accepted, determine that the incoming session invite was sent by the remote device to which the outgoing session invite is also addressed, determine a remote device priority value from identifying information contained in the incoming session invite, compare the remote device priority value with a local device priority value to determine whether the remote device or the local device is higher priority, and, if the remote device is higher priority, cancel the outgoing session invite and display an incoming call answer screen for the incoming session invite, and if the local device is higher priority, wait for cancelation of the incoming session invite and acceptance of the outgoing session invite.

In yet a further aspect, the present application describes non-transitory computer-readable media storing computer-executable program instructions which, when executed, configure a processor to perform the described methods.

Other aspects and features of the present application will be understood by those of ordinary skill in the art from a review of the following description of examples in conjunction with the accompanying figures.

In the description that follows, some example embodiments are described with reference to Session Initiation Protocol (SIP) as defined in IETF RFC 3261, which provides details of signaling for establishing IP-based communication sessions. For example, SIP may be used in establishing a media session between two end-points carried out using Real-time Transport Protocol (RTP). As a further example, RTP and SIP may be used in establishing and carrying out a Voice-over-LTE (VOLTE) call. Many of the embodiments described below involve a VOLTE-enabled device. However, it will be appreciated that the present application is not limited to VOLTE-enabled devices and VOLTE calls specifically. Moreover, the present application is not necessarily limited to embodiments that use SIP for session set-up and management. Other session initiation and control protocols may be used in some embodiments.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The IP Multimedia Subsystem or IP Multimedia Core Network Subsystem (IMS) is an architectural framework for delivering IP multimedia services. The main components of an IMS core network are:

1. PCSCF (Proxy-CSCF (Call Session Control Function)) is a SIP proxy that is the first point of contact for a SIP device (terminal).
2. HSS (home subscriber server), a database which contains the details of every IMS subscriber (phone numbers, credentials . . . ).
3. S-CSCF (Serving-CSCF) has two main functions:
   Stores the user location address (registrar) in a database
   Routes the call to the corresponding Telephony Application Server (called TAS or AS).
4. I-CSCF (Interrogating-CSCF) queries the HSS to select the appropriate S-CSCF that will serve the IMS/SIP Client.
5. AS (Application Server): the application server is not involved in the routing of messages, but is has a role in establishing the two legs of an IMS call:
   Originating leg: from calling device to the server.
   Terminating leg: from the server to the target device.

FIG. 1 shows a signal diagram 10, excerpted from Poikselkä, et al., Voice over LTE (VoLTE) (2012), John Wiley & Sons, illustrating the typical message flow for establishing a VOLTE call session between two VOLTE devices.

Figure 2:
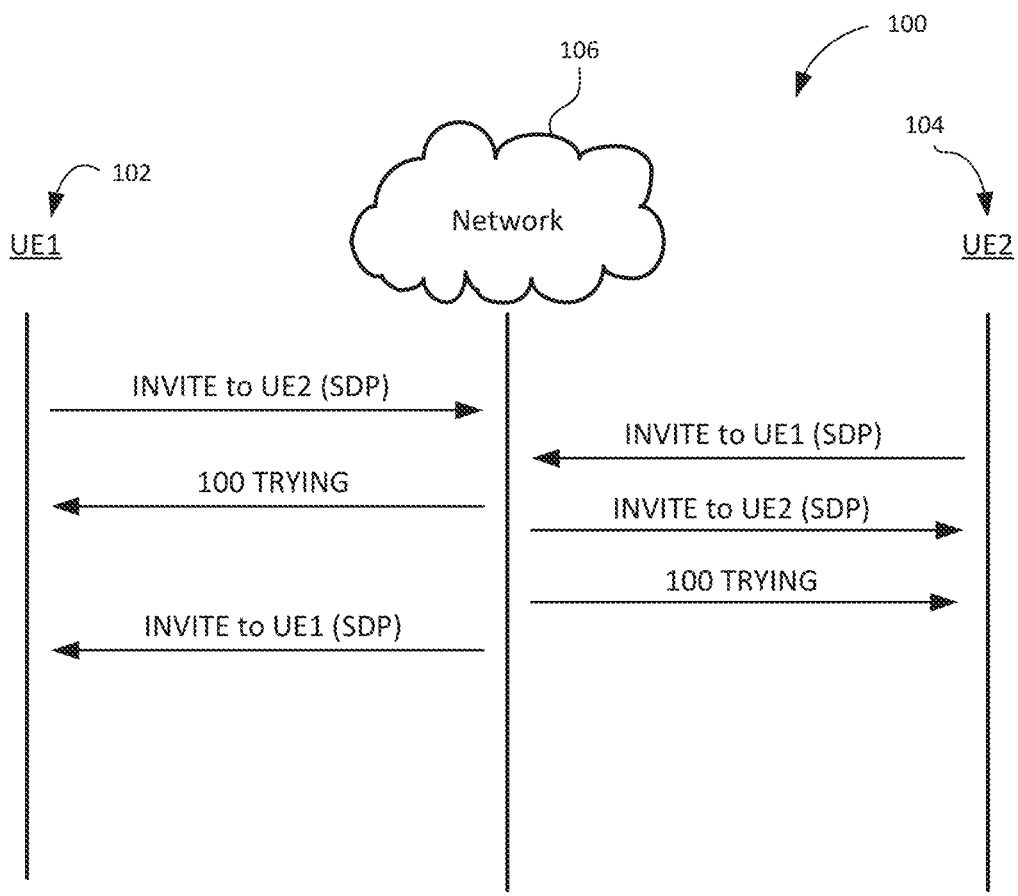
FIG. 2 shows a signal diagram for a crossed-invite situation during set-up of a session.

FIG. 2 shows a signal diagram 100 for a crossed-invite situation during set-up of a session. Although in this example, the signaling relates to set-up of a VOLTE call, in other examples it may related to other point-to-point media sessions.

As shown in the signal diagram 100, first user equipment (UE1) 102 sends a first INVITE message addressed to second user equipment (UE2) 104 via a network 106. The network 106 includes one or more interconnected wired or wireless networks, including private or public networks and combinations of public and private networks. The network 106 supports IP communications.

Before receipt of the first INVITE message at the UE2 104, the UE2 104 sends a second INVITE message addressed to the UE1 102. In a conventional circuit-switched network, the network prevents this collision at the network level and invokes call forwarding on busy, e.g. each party either gets a busy signal or, if applicable, is forwarded to voicemail. In the IMS/VOLTE context, both devices are configured to use a similar approach; that is, if they receive an INVITE from another party during call set-up or during an active call, the devices are configured to reject the INVITE with a 486 busy message. This will result in both calls either failing to connect or being forwarded to voicemail.

In accordance with one aspect of the present application, at least one of the devices (UE) detects the crossed-invite situation, determines which INVITE has higher priority, and acts to ensure the higher priority INVITE is available for acceptance. In some implementations, both devices detect the crossed-invite situation and both devices determine which INVITE is higher priority. The device that has received the higher priority INVITE then makes it available for acceptance, while the device with the lower priority INVITE cancels its outgoing INVITE. In some example embodiments, the determination of priority is made by the devices themselves independent of the network. In some other example embodiments, priority is assigned by the network to individual devices during registration with the network.

Figure 3:
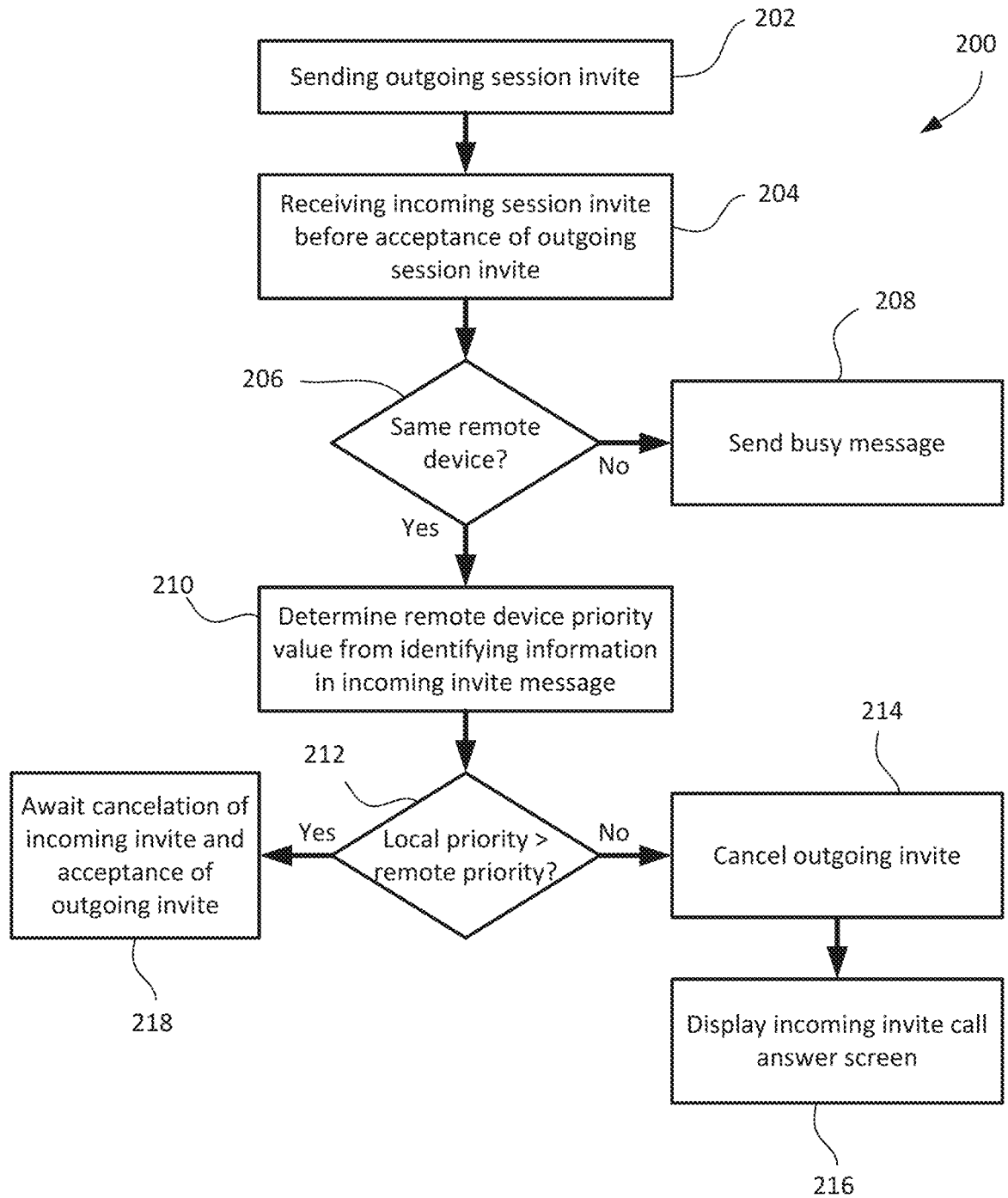
FIG. 3 shows, in flowchart form, one example method for crossed-invite session handling.

Reference is now made to FIG. 3, which shows, in flowchart form, one example method 200 for crossed-invite session handling. The example method 200 is implemented by one end point device; typically referred to as "user equipment" in SIP-related documents. The user equipment may be any communications device configured to make and receive packet switched voice (e.g. VOLTE calls), including mobile handheld devices.

The method 200 includes, in operation 202, first sending an outgoing session invite addressed to a remote device. Before acceptance of the outgoing session invite, an incoming session invite is received in operation 204. In operation 206, the local device determines whether the incoming session invite is from the same remote device to which it sent the outgoing session invite. If not, then the device handles the incoming session invite in the normal manner, as indicated by operation 208, in which it sends a 486 busy message in reply to the incoming session invite. However, if the incoming session invite is from the same remote device to which the outgoing session invite is addressed, then the device has identified a "crossed-invite" situation.

In operation 210, the device determines the remote device's "priority value". The priority value is determined from identifying information in the incoming session invite. In some instances, the incoming session invite includes the priority value as a parameter. In some instances, the device extracts some identifying information, such as the remote device's telephone number (e.g. tel uri) or SIP URI. It then derives the priority value from the identifying information, such as the SIP URI. For example, the priority value may be the numerical portion of the SIP URI, e.g. the user-part of the SIP address converted to an integer value. In another example, if the user-part includes non-numerical characters each character is converted to its ASCII equivalent value and the concatenated set of values is expressed as an integer. In yet other embodiments, various functions or operations may be applied to identifying information, like the SIP URI, to derive a unique pseudo-random remote device "priority value".

The local device has its own local "priority value" obtained in the same manner, i.e. assigned by the network or derived by the local device from corresponding identifying information regarding the local device. In operation 212, the local device compares its own priority value to the remote device's priority value to determine which device is "higher priority". In this embodiment, the "higher priority" device, i.e. the one that will have its session invite made available for acceptance, is the device with the larger value "priority value", although in other embodiments it could be the device with the lower value "priority value".

If the remote device takes priority, e.g. remote priority value>local priority value in this example, then in operation 214 the local device cancels its outgoing session invite and in operation 216 it makes the incoming session invite available for acceptance. It may do so, for example, by displaying a call answer screen with call details for the user to choose whether to accept the call or not. In some embodiments, the local device may be configured to automatically accept the call without obtaining explicit user acceptance on the basis that the device was attempting to set up a session with the same remote party; however, in many embodiments the device may still prompt the user to accept the incoming session. In some embodiments, operation 216 may occur prior to operation 214. That is, the incoming call may be presented for acceptance and then a cancel message sent in regards to the outgoing call. In some other embodiments, they may occur nearly simultaneously.

If the local device takes priority, e.g. remote priority value<local priority value in this example, then in operation 218 the local device awaits cancelation of the incoming session invite by the remote device and awaits acceptance of its outgoing session invite.

Figure 4:
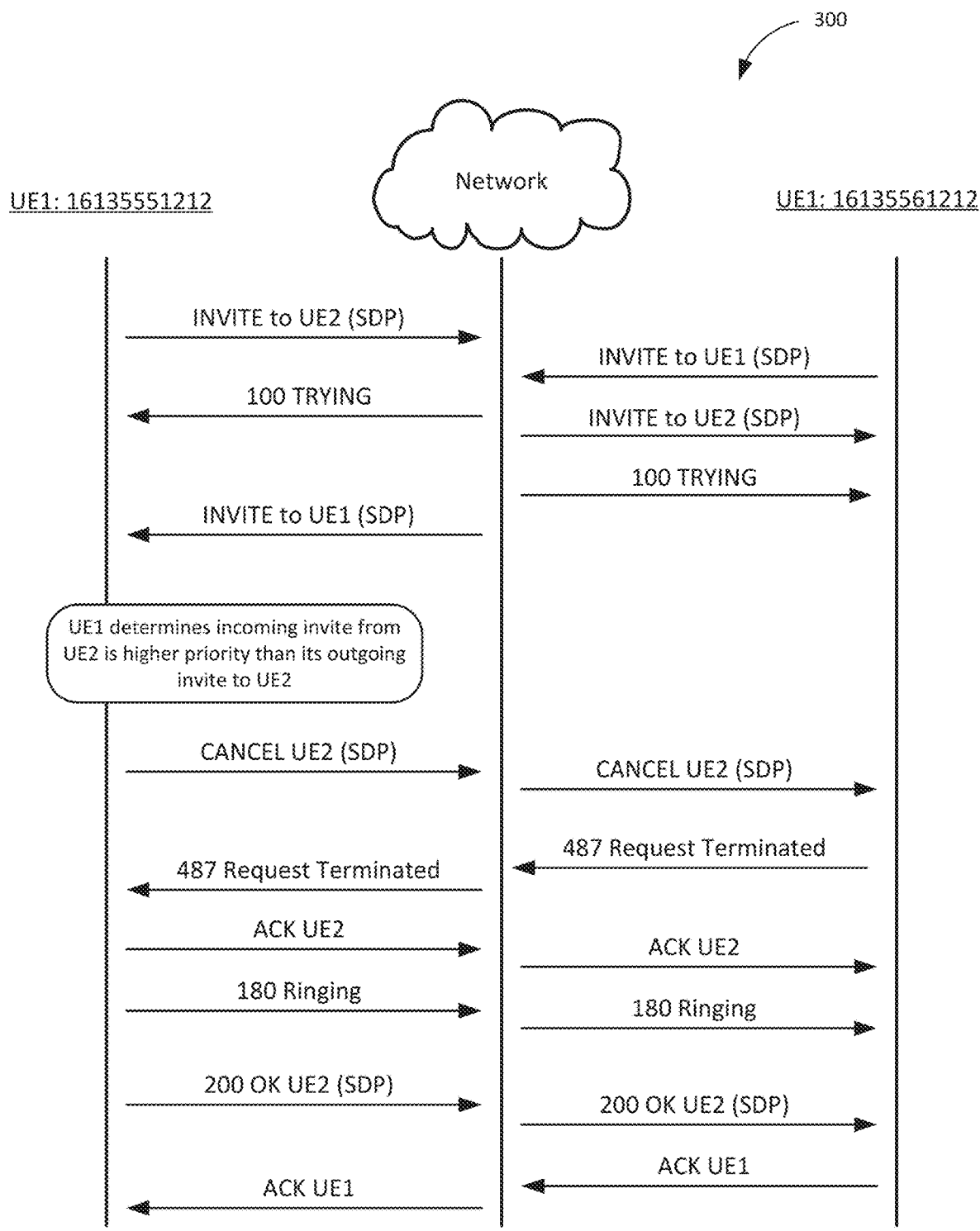
FIG. 4 shows an example signal diagram for crossed-invite session handling.

A more specific example is illustrated by way of a signal diagram 300 shown in FIG. 4. In this example, UE1 has a SIP URI of sip:+16135551212@carrier1.com. UE2 has a SIP URI of sip:+16135561212@carrier2.com. This example illustrates a user-centric approach to priority determination.

UE1 sends a SIP invite message addressed to UE2. Before that message is provided to UE2, UE2 sends a SIP invite message addressed to UE1. In this example, at least UE1 is configured to detect the crossed-invite situation. When UE1 receives the incoming invite message from UE2, it determines from the invite message that it originated with the same addressee to which the outstanding invite was sent. Accordingly, UE1 then extracts identifying information from the invite message in order to determine the remote device priority value. In this example, it extracts the number 16135561212, as the user part of the SIP URI for UE2. UE1's own priority value is given by the number 16135551212. Accordingly, UE1 compares the priority values and determines that the remote device's priority value is larger. Therefore, in this example, the invite from UE2 to UE1 takes priority over the invite from UE1 to UE2.

Upon determining that its invite is lower priority, UE1 sends a CANCEL message to UE2 with regard to its outstanding INVITE. UE2 acknowledges this with a 487 Request Terminated message, which is then acknowledged by UE1 with an ACK message. UE1 then sends a 180 Ringing message to UE2 to advise UE2 that it is presenting the session initiated by the INVITE from UE2 for acceptance. If the session is then accepted by the user of UE1, UE1 sends a 200 OK message to UE2, which then responds with an ACK message, and the session is established.

It will be appreciated that there may be additional signaling and control messages sent during this sequence that are not show in the diagram 300, in particular between the UE devices and various components within the network.

In another example, the example SIP URI may contain non-numeric characters, such as sip.billing013@carrier2.com. In this case, one example implementation is to extract the user part, "billing013", and convert each ASCII character to its equivalent ASCII code. In this example, the text "billing013" could be converted to: 98105108108105110103484951, if both the non-numeric and numeric characters are converted to ASCII code values. In some cases only the non-numeric characters are converted to ASCII code values.

In some examples, the device may apply a function or operation to the extracted identifying information, e.g. a randomizing function in some cases, as a part of determining the priority value. It will be appreciated that all devices would apply the same randomizing function so that both devices involved in a crossed-invite situation determine the same respective priority values for each other and, thus, mutually agree on which invite is to be cancelled and which invite is to be presented for acceptance.

In the above examples, the end point devices (e.g. UE1 and UE2) each determine their own priority value and determine the priority value of the other party using identifying information for the other party received in an invite message. In another example embodiment, a priority value may be pre-assigned to a device when it registers with the network and it may include its assigned priority value in its outgoing invite messages. That is, the network itself may assign priority values to devices upon the device registering with the network.

In another embodiment, the network sends the priority value (may also be referred to as a priority token) to the device in a 200 OK message when the device is registering with the network. The priority token may be determined by the network based on one or more identifying parameters regarding the device. For example, parameters may include the device international mobile subscriber identity (IMSI), the device phone number, or other such parameters. In some cases, the priority token may incorporate a timestamp. In some cases, it may be at least partly randomized using a randomizing function. One example implementation for determining a priority token is:

PriorityToken=RAND_FUNC(phone number)+
RAND_FUNC(time)+timestamp+IMSI value

It will be appreciated that many other functions may be used to generate unique priority values/tokens for devices.

The priority token must be unique in order to avoid token collision problems (two devices having the exact priority value). The uniqueness of the priority token may be ensured through having a single token generator. In one example, the priority tokens are generated using a distributed or single Hash table, and the network has to make sure access to the token generator is synchronized and atomic across multiple TAS. In another example, the format of priority token is such that it avoids the possibility of the same token being generated, as with the example function above. Even in the unlikely case that the randomizing functions produce the same random values, the IMSI (taken from the SIM card) and timestamp ensure uniqueness. It will be understood that there are many other techniques for generating pseudo-random token values.

One advantage of a carrier-centric solution is that a device will know whether the other device that is involved in a crossed-invite situation is configured to implement this feature because their invite message will include the priority value. If the device is not able to implement this feature, or if the carrier or an administrator has disabled operation of this feature, then the invite will not contain a priority value or the invite will contain a value (set by the remote device or set by the carrier) designated to signal that the device does not implement this feature.

In the above examples, it is presumed that both the local device (UE1) and the remote device (UE2) are configured to carry out the process of determining and comparing priority values; however, there are situations when at least one of the device is unable to identify the crossed-invite situation, or is not configured to carry out this process. These special cases may involve exception handling.

Remote Party is not a VOLTE Device

The local device may be able to determine that the remote device is not a VOLTE device and does not implement this feature based on characteristics of the invite message from the remote device. For example, in a VOLTE call situation, the local device may receive an INVITE message from a non-VOLTE device. In that case, the invite message will not contain an MMTEL (Multimedia telephony service) tag.

In this case, the local device may automatically determine that the non-VOLTE remote device's call is of higher priority. Accordingly, the local device will cancel its invite message or, if it has already received an indication that the outgoing call is being forwarded (e.g. via a 181 message), such as would occur if it is being re-routed to voicemail, then the local device will terminate call setup for the outgoing call, and it will present the incoming invite for acceptance. The remote device, being unable to detect the crossed-invite situation, will see that its invite was presented for acceptance by virtue of a 180 Ringing message from the local device. The remote device will not be aware that the local device was simultaneously attempting to initiate a session with it.

Following a call forwarding indication (i.e. a 181 message), there are typically a number of set-up messages exchanged (e.g. negotiating resources, codecs, etc.). During this exchange, if an incoming SIP invite is received from a non-VOLTE device that is deemed higher priority, then the negotiation to set up the call forwarded (e.g. with a voicemail server) may be terminated in order to accept the incoming call. There may be rules in place to refuse the incoming SIP invite if the negotiation has proceeded to the point where the user experience at the local device is going to be negatively impacted. For example, once a 200 OK message is received from the voicemail server (as an example) so as to establish the session, then any SIP invite that arrives will be refused.

Although the most typical example of a call forwarding situation is forwarding to voicemail (perhaps due to the fact the remote UE is busy attempting an outgoing call to the local UE), it is possible for situations to arise in which the remote device has enabled call forwarding to another UE.

One Party has Hidden Identity

The party with the hidden identity is able to detect the crossed-invite situation, but the other party is not able to detect it since it would not know that the incoming invite was sent by the same device to which it just sent an outgoing invite. Accordingly, the device with hidden identity automatically determines that the other device's call is of higher priority.

In some embodiments, devices may be configured to regularly query their call-barring status with the network in order to determine whether their identity will be hidden for outgoing calls. In some embodiments, devices may be configured to query their call-barring status prior to initiating a session, such as during launch or activation of a communications application, such as a VOLTE application on the device.

If the device determines that its identity is hidden (due to a hidden-identity setting on the device or by the network), then the device stores that status in memory so that when it detects a crossed-invite situation it can locally query whether its identity is hidden.

Note that if both parties have their identities hidden, then the crossed-invite session handling process cannot be used since neither device will be able to detect the crossed-invite situation.

Remote VOLTE Device does not Implement this Feature

In some cases, the remote device may be a VOLTE device (and thus has an MMTEL tag in its invite), but the remote device may not implement this feature. The handling of this exception may depend on whether the priority value is determined by the devices or whether it is assigned by the network upon registration. If it is assigned by the network, then the fact that a remote VOLTE device does not implement this feature will be apparent to the local device based on the fact that the invite message does not contain the remote device's priority value. Accordingly, in that case, the situation may be handled in the same manner as determining that the remote device is not a VOLTE device, as described above. That is, the local device will treat the remote device as having a higher priority.

However, in the case of a device-determined priority value, the local device will be unaware that the remote device does not implement this feature. This situation may lead to two use cases: where the remote device has voicemail enabled (more generically, call forwarding the session to another device), and where the remote device does not have voicemail enabled (more generically, when call forwarding does not occur). As noted above, the most common call forwarding case is forwarding to voicemail, but other situations may arise in which a call to the remote UE is forwarded to a third UE.

If the remote device does not have voicemail enabled, then the outgoing call from the local device to the remote device will result in a 486 busy message back to the local device. If the local device determines that it has lower priority, then it will attempt to cancel its outgoing call, possibly before receiving the 486 busy signal. Either way, it will present the incoming call from the remote device for acceptance and will either end or cancel its outgoing call. But if the local device determines that it has higher priority, then it will be awaiting acceptance of its outgoing call and cancellation of the incoming call. When it receives the 486 busy signal, it will deduce that the remote device did not detect the crossed-invite situation and will instead present the incoming call for acceptance.

In the case of call forwarding (e.g. to voicemail), if the local device has higher priority, then the local device will be awaiting acceptance of its call and cancellation of the incoming call. When the device recognizes that its call has been forwarded (e.g. through receipt of a 181 message), then it may reject the incoming invite from the remote device.

If the remote device forwards the call, e.g. to voicemail, and the local device has lower priority, then the local device may apply these rules:

1. if during the outgoing call setup, it receives a 181 call forwarding message and completes the connection to voice mail (200 OK received from network) prior to receiving the incoming SIP invite and/or determining that it is the lower priority device in response to receiving the incoming SIP invite, then the local device sends 486 busy for the incoming call; and otherwise,
2. cancel the outgoing call that is being forwarded to (for example) voicemail and present the incoming call for acceptance.

It will be appreciated that the above-described condition may occur whenever the local device is the lower priority device, i.e. it will try to cancel its call and accept the incoming call, and the remote device attempts to send the outgoing call from the local device to another endpoint, e.g. voicemail. This may occur if the local device has a hidden identity, if the remote device is a non-VOLTE device, or if the remote device is a VOLTE device that does not implement the crossed-invite feature.

Figure 5:
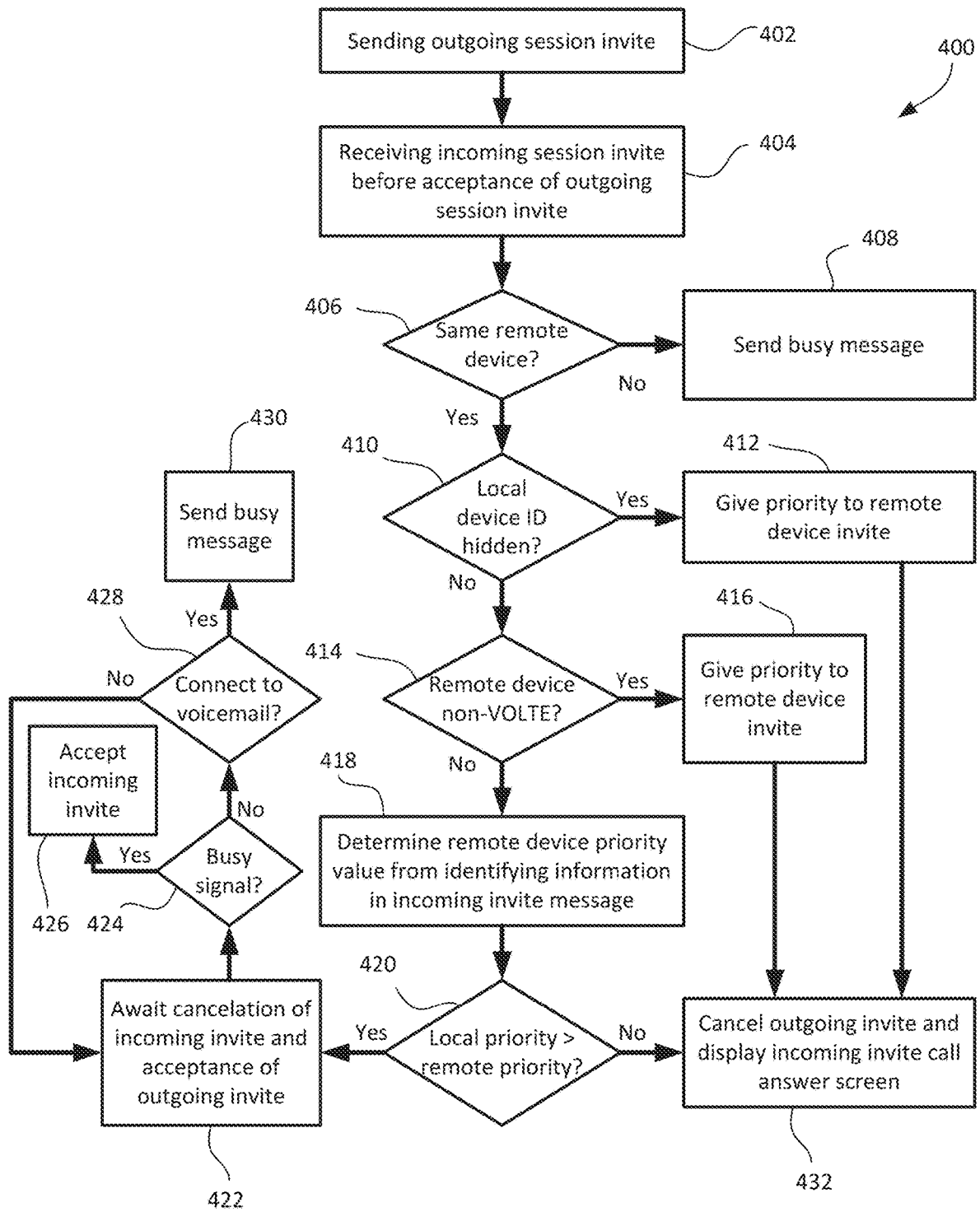
FIG. 5 shows, in flowchart from, an example method for handling crossed-invite situations during session initiation, with exception or special case handling.

Reference will now be made to FIG. 5, which shows, in flowchart from, an example method 400 for handling crossed-invite situations during session initiation, with exception or special case handling. This example relates to crossed-invites in the context of establishing a VOLTE call. It will be appreciated that a similar process may be used in the handling of crossed-invites with regard to other point-to-point media sessions, and in particular those point-to-point media sessions that use SIP for establishing the session. The method 400 is implemented by one of the end points (user equipment) referred to herein as the local device. The local device may be, in some examples, a mobile device, desktop VoIP phone, personal computer, etc.

The method 400 includes sending an outgoing session invite addressed to a remote device in operation 402, and, in operation 404, receiving an incoming session invite before the outgoing session invite has been accepted. In operation 406, the local device determines from the incoming invite message whether the incoming invite originates from the same remote device to which it sent the outgoing session invite. If not, then in operation 408 the local device replies to the incoming session invite with a busy message (which the network may handle by routing the call to voicemail, if so configured). However, if the incoming invite does come from the same remote device to which the local device sent the outgoing invite, then the local device has identified a crossed-invite situation.

To handle the crossed-invite situation, in operation 410 the local device first assesses whether its identity is hidden, i.e. whether the session invite sent to the remote device would have excluded identifying information regarding the local device. If so, then the local device knows that the remote device will be unable to detect the crossed-invite situation, so in operation 412 it determines that the remote device has priority.

If the local device's identity was not hidden, then in operation 414 the local device determines whether the remote device is a non-VOLTE device. The local device may make this determination based on whether the incoming session invite includes an MMTEL tag (or other indicia of a VOLTE device). In the case of carrier-assigned priority tokens, in this operation 414 the local device may also assess whether the remote device, even if a VOLTE device, did not provide a priority token in its invite message, which would be indicative that the remote device does not support, or has disabled, the crossed-invite handling feature. If the remote device is a non-VOLTE device (or is a VOLTE device that does not implement the crossed-invite handling process), then in operation 416 the local device determines that the remote device has priority.

If the remote device is a VOLTE device, and the local device has not determined that the remote device does not implement this feature (either because the invite contains a priority token in the case of network-assigned tokens, or because it cannot know whether this feature is implemented by the remote device in the case of device-determined priority values), then in operation 418 the local device determines the respective priority values of the local and remote devices. In particular, the local device extracts some identifying information, such as a network-assigned priority token or the user part of a SIP URI or other data regarding the remote device, and determines the remote device's priority value. As described above, the determination of the priority value may involve applying a function or other manipulation to the extracted identifying information to derive the remote device's priority value.

In operation 420, the local device's priority value and the remote device's priority value are compared to determine which has higher priority.

The handling of the crossed-invite situation is then dependent upon which device has higher priority. If the local device is the higher priority device, then in operation 422 it awaits cancelation of the incoming session invite by the remote device and acceptance of its outgoing session invite by the remoted device.

In this case, the local device may be configured to handle the exception where the remote device does not implement this feature. That is, while waiting for the crossed-invite situation to be resolved by the remote device cancelling its invite, in operation the local device may receive a busy message, which indicates that the remote device does not implement this feature. In that case, the local device presents the incoming session invite for acceptance (or, in some embodiments, automatically accepts the session without soliciting user acceptance), as shown by operation 426.

If the remote device is configured to send busy calls to voicemail, then instead of receiving a busy signal the local device receive a message, such as a 181 message, indicating that the call is being forwarded instead of being cancelled, as indicated by operation 428. If the remote device finds that is outgoing session invite is going to be connected to voicemail, then it will complete negotiated setup of the voicemail call to the user and will refuse the incoming session invite in operation 430.

Returning to operation 420, if the local device determines that it has lower priority and the remote device has the higher priority, whether in operation 420, 412 or 416, then in operation 432 it will attempt to cancel its outgoing session invite and present the incoming session invite for acceptance (or automatically accept it, depending on implementation). Note that this operation 432 may include special handling for situations in which the outgoing call is call forwarded, e.g. to voicemail. As noted above, the handling may depend on when the incoming SIP invite is received relative to the set-up of the forwarded call. In one example, if it is received after receipt of a 181 call forwarding message, then the incoming invite may be refused and the setup of the forwarded call completed. In another example, the incoming invite may only be refused if the setup of the forwarded call has concluded with receipt of a 200 OK message. Other implementations may handle this situation using other rules, and the handling of these conditions may vary depending on the implementation.

Figure 6:
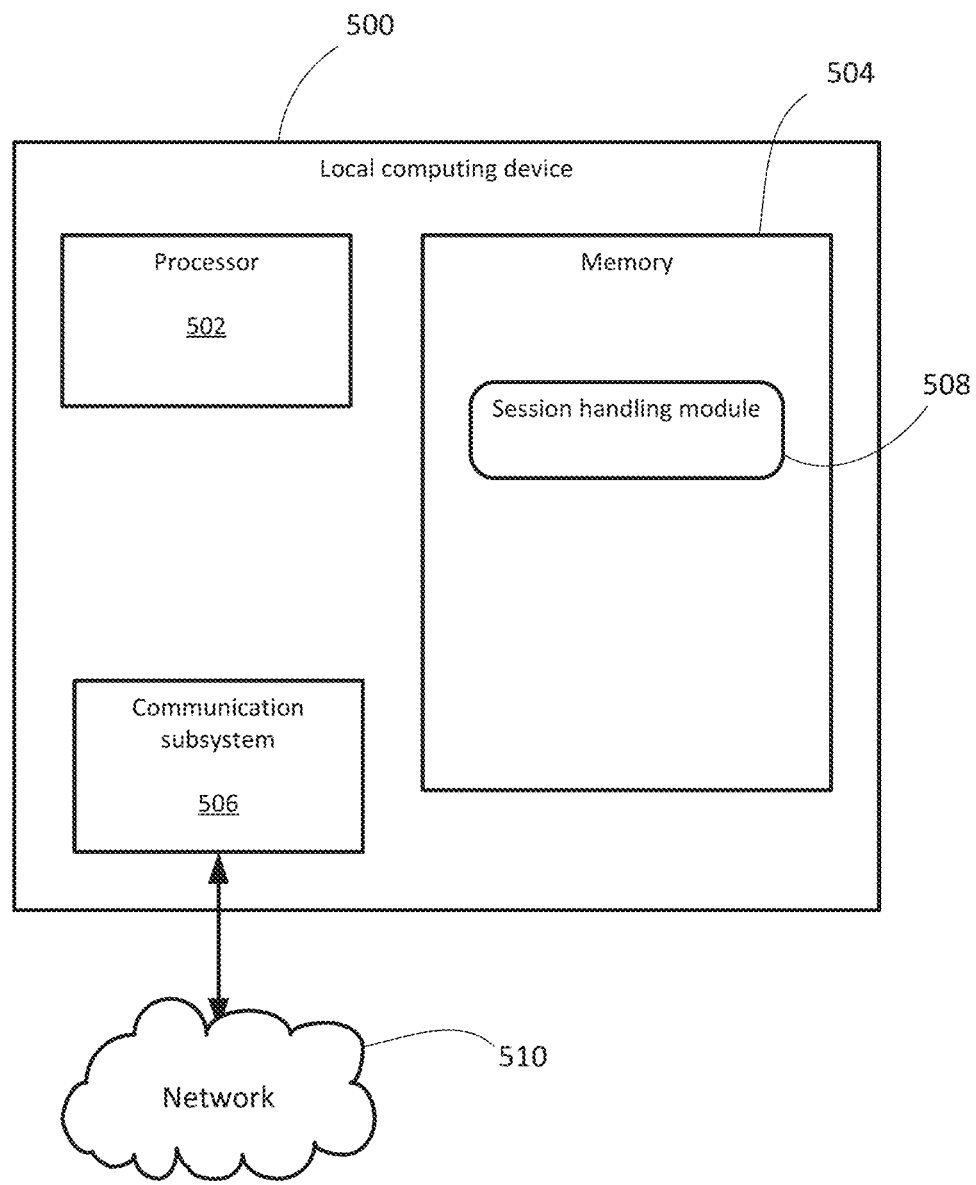
FIG. 6 shows in block diagram form, a simplified example of a device implementing at least one example of the crossed-invite handling processes Similar reference numerals may have been used in different figures to denote similar components.

Reference is now made to FIG. 6, which shows in block diagram form, a simplified example of a device 500 implementing at least one example of the crossed-invite handling processes described herein. The device 500 include a processor 502, memory 504 and a communication subsystem 506 to communicate with a network 510. Communications may be over wired, wireless, or both wired and wireless connections. Communications may be packet-based and, in particular, support IP-based communications. The memory 504 includes a session handling module 508 for initiating and establishing communications sessions, such as, for example, VOLTE calls. The session handling module 508 uses SIP, in some embodiments, to set up and manage sessions. Although shown as a standalone module for ease of discussion, the session handling module 508 may be incorporated within other software, including within the communication subsystem 506, an operating system, individual communications applications, or within firmware on the device 500, as examples.

It will be appreciated that the device 500 implementing the above-described operations may be implemented by a number of computing devices, including, without limitation, suitably-programmed general purpose computers, mobile devices, laptops, desktop VoIP phones, or other devices capable of IP-based communications. The described operations may be implemented by way of software containing instructions that, when executed by a processor or processors, cause the processor or processors carry out the functions described herein. The software instructions may be stored on any suitable non-transitory computer-readable memory, including CDs, RAM, ROM, Flash memory, etc.

It will be understood that the devices described herein and the module, routine, process, thread, or other software component implementing the described method/process for configuring the devices may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method implemented at a local device for handling crossed-invites during set-up of an IP-based session with a remote device, the method comprising:
   receiving an incoming session invite after sending an outgoing session invite before the outgoing session invite has been accepted;
   determining that the incoming session invite was sent by the remote device to which the outgoing session invite is also addressed;
   determining a remote device priority value from identifying information contained in the incoming session invite;
   comparing the remote device priority value with a local device priority value to determine whether the remote device or the local device is higher priority;
   determining that the local device is higher priority; and
   while waiting for cancelation of the incoming session invite and acceptance of the outgoing session invite, detecting a busy signal in response to the outgoing session invite and, on that basis, displaying an incoming call answer screen for the incoming session invite.

2. The method claimed in claim 1, wherein the identifying information comprises a user-part of a remote device address.

3. The method claimed in claim 2, wherein the remote device priority value is derived from the user-part of the remote device address, and wherein the local device priority value is derived from a user-part of a local device address.

4. The method claimed in claim 3, wherein the remote device address and the local device address comprise SIP URIs.

5. The method claimed in claim 1, further comprising:
   determining that the local device's identity was not hidden in the outgoing session invite and determining that the remote device is a voice-over-LTE device based on a characteristic of the incoming session invite prior to comparing the remote device priority values.

6. A local device configured to handle crossed-invites during set-up of an IP-based session with a remote device, the local device comprising:
   a processor;
   memory;
   a communication subsystem to communicate with a network over one or both wired and wireless connections to, under control of the processor, send and receive messages; and
   a session handling module to establish sessions with other devices, the session handling module including processor-executable instructions that, when executed by the processor, cause the processor to:
      receive an incoming session invite after sending an outgoing session invite before the outgoing session invite has been accepted,
      determine that the incoming session invite was sent by the remote device to which the outgoing session invite is also addressed,
      determine a remote device priority value from identifying information contained in the incoming session invite,
      compare the remote device priority value with a local device priority value to determine whether the remote device or the local device is higher priority;
      determine that the local device is higher priority; and
      while waiting for cancelation of the incoming session invite and acceptance of the outgoing session invite, detect a busy signal in response to the outgoing session invite and, on that basis, display an incoming call answer screen for the incoming session invite.

7. The local device claimed in claim 6, wherein the identifying information comprises a user-part of a remote device address.

8. The local device claimed in claim 7, wherein the remote device priority value is derived from the user-part of the remote device address, and wherein the local device priority value is derived from a user-part of a local device address.

9. The local device claimed in claim 8, wherein the remote device address and the local device address comprise SIP URIs.

10. The local device claimed in claim 6, wherein the instructions, when executed, further cause the processor to:
   determine that the local device's identity was not hidden in the outgoing session invite and determine that the remote device is a voice-over-LTE device based on a characteristic of the incoming session invite prior to comparing the remote device priority values.

11. A non-transitory processor-readable medium storing processor-executable instructions for handling crossed-invites during set-up of an IP-based session with a remote device, wherein the processor-executable instructions, when executed by a processor in a local device, cause the processor to:
   receive an incoming session invite after sending an outgoing session invite before the outgoing session invite has been accepted;
   determine that the incoming session invite was sent by the remote device to which the outgoing session invite is also addressed;
   determine a remote device priority value from identifying information contained in the incoming session invite;
   compare the remote device priority value with a local device priority value to determine whether the remote device or the local device is higher priority;
   determine that the local device is higher priority; and
   while waiting for cancelation of the incoming session invite and acceptance of the outgoing session invite, detect a busy signal in response to the outgoing session invite and, on that basis, display an incoming call answer screen for the incoming session invite.

* * * * *